US006867892B2

(12) United States Patent
Akimoto (10) Patent No.: US 6,867,892 B2
(45) Date of Patent: Mar. 15, 2005

(54) CONTROL METHOD AND DRIVE CIRCUIT FOR POLARIZATION SCRAMBLER

(75) Inventor: Kazuaki Akimoto, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 6 days.

(21) Appl. No.: 10/342,296

(22) Filed: Jan. 15, 2003

(65) Prior Publication Data

US 2004/0042702 A1 Mar. 4, 2004

(30) Foreign Application Priority Data

Aug. 27, 2002 (JP) ........................................ 2002-246899

(51) Int. Cl.[7] ................................................ G02F 1/03
(52) U.S. Cl. ...................................... 359/245; 359/237
(58) Field of Search ................................ 359/321–323, 359/256, 484, 483, 489; 398/65

(56) References Cited

U.S. PATENT DOCUMENTS

| 5,247,382 A | * | 9/1993 | Suzuki | ........................ 398/201 |
| 5,986,784 A | * | 11/1999 | Kersey et al. | .............. 398/152 |
| 2003/0067667 A1 | * | 4/2003 | Wang et al. | ................ 359/323 |

FOREIGN PATENT DOCUMENTS

| JP | HEI 8-065270 | 3/1996 |
| JP | HEI 8-222749 | 8/1996 |
| JP | HEI 9-18422 | 1/1997 |

OTHER PUBLICATIONS

Heisman, F., "Compact Electro–Optic Polarization Scramblers for Optically Amplified Lightwave Systems," IEEE Journal of Lightwave Technology, vol. 14, No. 8, pp. 1801–1814, Aug. 1996.

* cited by examiner

Primary Examiner—Georgia Epps
Assistant Examiner—M. Hasan
(74) Attorney, Agent, or Firm—Staas & Halsey LLP (57) ABSTRACT

A method of controlling a polarization scrambler which changes a state of polarization of incident light with time in accordance with a driving voltage. The method includes a first step of applying the driving voltage so that the polarization state of the incident light changes from a starting point and makes N rotations (where N is a positive integer) around a longitude line of the Poincare sphere in a unit time, and a second step of applying the driving voltage so that the polarized light at the starting point on the Poincare sphere becomes the polarized light at an arbitrary position on the Poincare sphere instantaneously. The first step and the second step are repeated.

9 Claims, 8 Drawing Sheets

WHEN $\lambda = \lambda_0$

FIG. 4

WHEN $\lambda < \lambda_0$

CONTROL METHOD AND DRIVE CIRCUIT FOR POLARIZATION SCRAMBLER

BACKGROUND OF THE INVENTION (1) Field of the Invention

The present invention relates to a control method and a drive circuit for a polarization scrambler which changes the state of polarization of incident light with time.

(2) Description of the Related Art

When transmission factors for optical components are measured, a light source for measurement, such as a semiconductor laser, a light-emitting diode (LED), a super luminescent diode (SLD), etc., is generally employed. Such a light source usually emits linearly polarized light. Therefore, in the case where measurements must be made in a state of non-polarization, linearly polarized light is caused to be in a state of non-polarization by a polarization scrambler.

Figure 8:
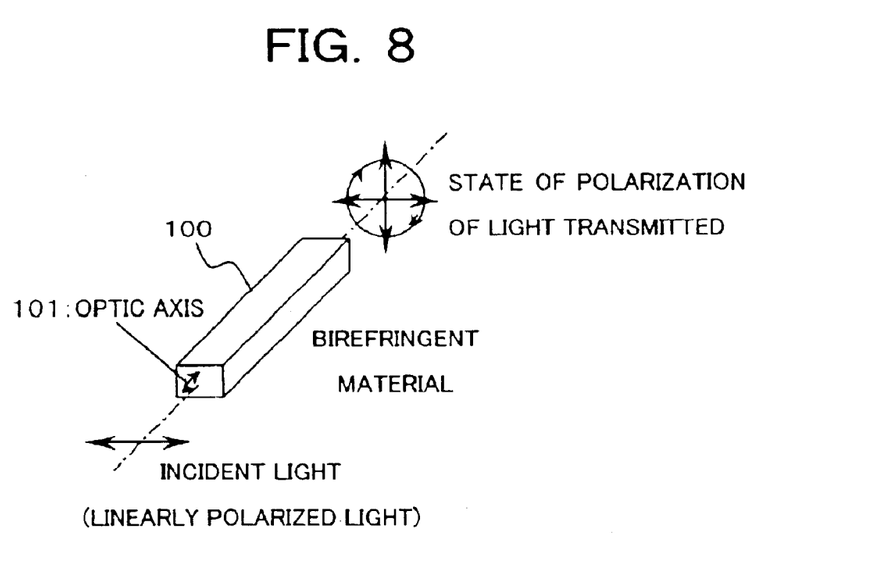
FIG. 8 is a diagram used to explain the state of polarization of light transmitted through a birefringent material.

Existing polarization scramblers are constructed mainly of birefringent materials. Examples of birefringent materials are an electro-optical crystal such as LN, (Pb,La) (Zr,Ti)$O_3$ (hereinafter referred to as PLZT), etc., a liquid crystal, an optical fiber, etc. As shown in FIG. 8, for example, the optic axis 101 of a birefringent material 100 is basically disposed within a plane perpendicular to a direction in which incident light propagates. In the case where incident light is linearly polarized light, the optic axis 100 is disposed to form an angle of 45 degrees with the direction of polarization.

Light incident on the birefringent material 100 is divided into ordinary light and extraordinary light, which propagate through the birefringent material 100. At the exit end of the birefringent material 100, the ordinary light and the extraordinary light are synthesized with a phase difference $\Delta\phi$ represented by the following Eq. (1):

$$\Delta\phi = (2\pi/\lambda) \cdot \Delta n \cdot L \quad (1)$$

where $\Delta n$ is the refractive index difference between ordinary light and extraordinary light, L is the length of the birefringent material 100, and $\lambda$ is the wavelength of incident light.

If a predetermined driving voltage waveform is applied across the birefringent material 100, a change in the refractive index difference $\Delta n$ occurs by an electric-optical effect (when the birefringent material 100 is LN or PLZT), or by rotation of a liquid crystal molecule (when the birefringent material 100 is a liquid crystal), or by an photo-elastic effect (when the birefringent material 100 is an optical fiber) which is obtained by deforming an optical fiber with a piezoelectric element, etc.

With an increase in the refractive index difference $\Delta n$, the polarization state of the synthesized light changes in the order of linear polarization→circular polarization→diagonal linear polarization→reverse circular polarization→original linear polarization. Note that a Faraday rotator is often utilized instead of the birefringent material 100. In this case, a driving current waveform is applied across the Faraday rotator, and incident light with linear polarization is rotated by a Faraday effect while holding the linear polarization. The relation of a driving voltage waveform to the birefringent material 100 is the same as the relation of a driving current waveform to a Faraday rotator.

The light synthesized as described above is instantaneously in a certain polarization state, and is not in a non-polarization state. However, if the cycle of a driving voltage waveform is made sufficiently shorter than a response time or sampling cycle for measurement, then the result of measurement will be the same as the result of measurement in a non-polarization state. That is, a measuring system is in a non-polarization state. Under such a principle, polarization scramblers operate.

Note that the definition of the degree of polarization (DOP) is given by the following Eq. (2):

$$DOP = (S_1^2 + S_2^2 + S_3^2)^{1/2} / S_0 \quad (2)$$

where $S_0$, $S_1$, $S_2$, and $S_3$ are Stokes parameters.

The Stokes parameter represents the state of polarization averaged at a certain time. When the DOP is considered as described above, the Stokes parameter is a value averaged in the cycle of a driving voltage waveform that is sufficiently shorter than a sampling cycle for measurement. The Stokes parameter (vector) in this state will hereinafter be referred to as an average Stokes parameter (vector).

Figure 9:
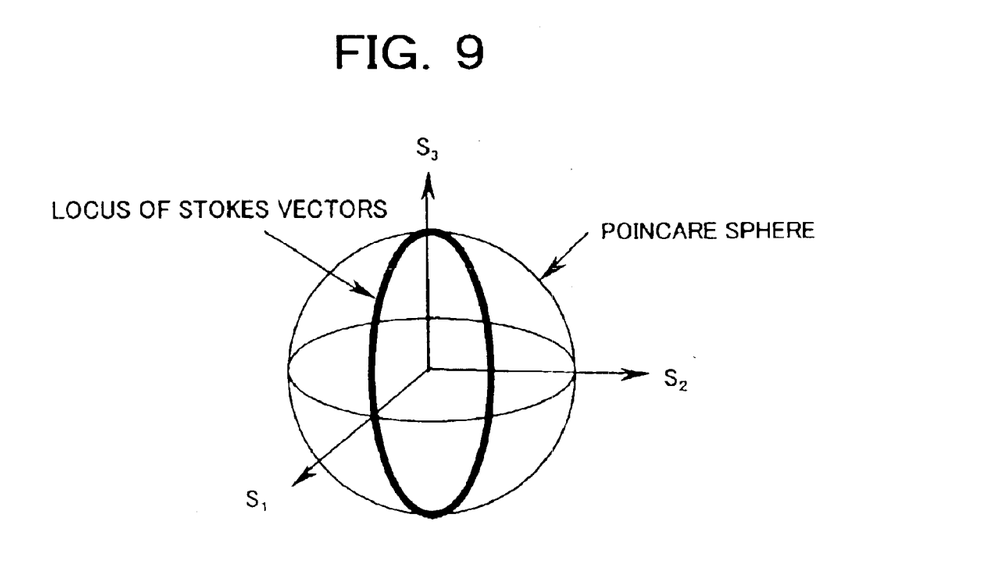
FIG. 9 is a diagram showing the locus of changes in instantaneous polarization on the Poincare sphere.

To represent an instantaneous polarization state, consider instantaneous polarization as a Stokes parameter (vector) averaged in a sufficiently shorter time than the cycle of a driving voltage waveform. In the case of FIG. 9, for example, instantaneous polarization is present on a longitude line that is a line of intersection between plane $S_2=0$ and the Poincare sphere. If a driving voltage waveform is applied across a polarization scrambler (phase shifter), the state of polarization represented on the longitude line will change. Note that the position corresponding to the north pole of the Poincare sphere represents circularly polarized light. The position corresponding to the south pole represents left-circularly polarized light, the position corresponding to the equator represents linearly polarized light, and other positions represent elliptically polarized light.

If the amplitude of a driving voltage waveform is adjusted so that the aforementioned phase difference $\Delta\phi$ represented by Eq. (1) is exactly 0 to $2\pi$ at a certain wavelength $\lambda 0$, and a change in the refractive index difference $\Delta n$, that is, a driving voltage waveform is selected so that instantaneous polarization is present uniformly on the longitude line within the cycle of the driving voltage waveform, then $S_1^2 + S_3^2$ will approach zero and the DOP will approach zero. That is, linearly polarized light is caused to in a state of non-polarization. On the other hand, in the case where no driving voltage waveform is applied, $S_1^2 + S_3^2$ equals $S_0^2$ in average and instantaneously, and the DOP becomes 1. That is, linearly polarized light is caused to be in a complete polarization state.

Figure 10:
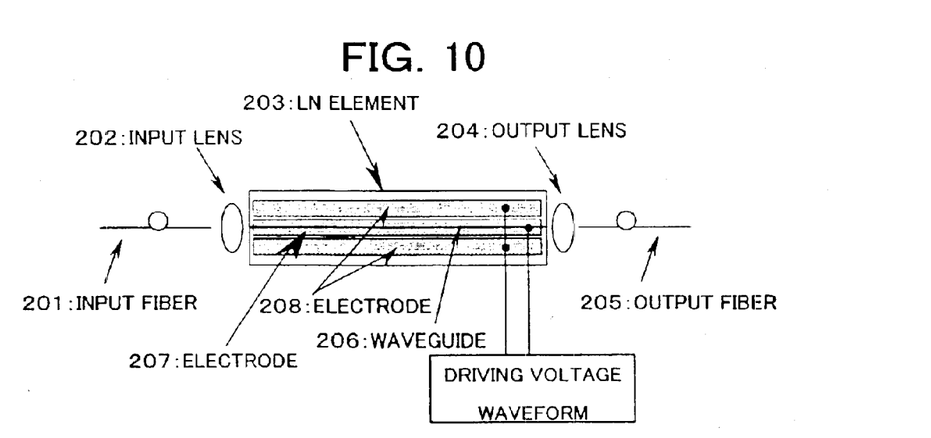
FIG. 10 is a block diagram showing a conventional polarization scrambler employing LN.
Figure 11:
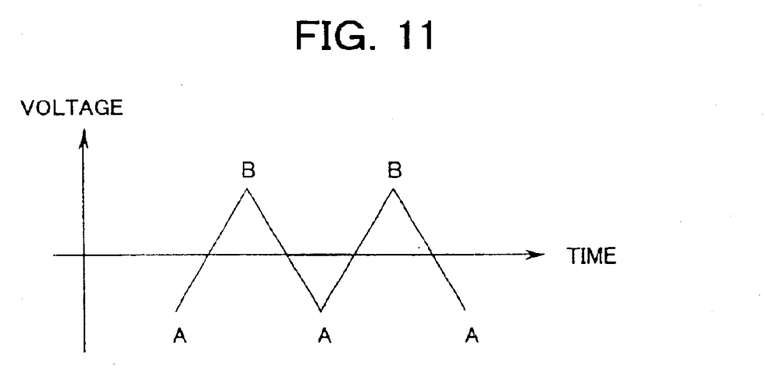
FIG. 11 is a diagram showing a driving voltage waveform employed in the polarization scrambler shown in FIG. 10.
Figure 12:
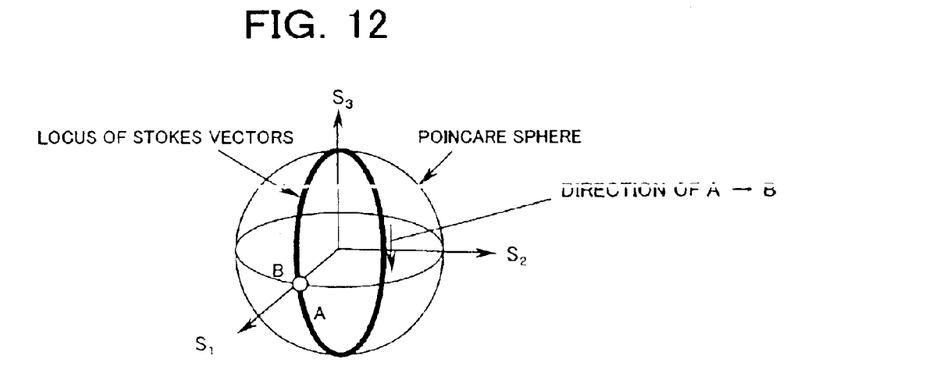
FIG. 12 is a diagram showing the locus of changes in polarization on the Poincare sphere ($\lambda=\lambda 0$) in the case where the driving voltage waveform shown in FIG. 2 is employed.

As an example, the construction of a polarization scrambler employing LN is shown in FIG. 10, a driving voltage waveform is shown in FIG. 11, and a state of polarization is represented by a locus on the Poincare sphere in FIG. 12.

As shown in FIG. 10, the polarization scrambler includes an input fiber 201, an input lens 202, an LN element 203, an output lens 204, and an output fiber 205. The LN element 203 is equipped with a waveguide 206. Electrodes 207 and 208 are formed around and near the waveguide 206.

The driving voltage waveform shown in FIG. 11 is applied between the electrodes 207 and 208, and the amplitude is adjusted so that the aforementioned phase difference $\Delta\phi$ is exactly 0 to $2\pi$ at a certain wavelength $\lambda 0$. In addition, since the refractive index difference $\Delta n$ is approximately proportional to the amplitude of a driving voltage, a waveform that varies linearly (e.g., a triangular waveform shown in FIG. 11) is employed so that instantaneous polarization is distributed uniformly on a longitude line of the Poincare sphere within the cycle of a driving voltage waveform. However, in the case of a polarization scrambler employing LN, it is known that if a driving voltage waveform has a DC component, the characteristics of LN will change. For this reason, a driving voltage waveform having no DC component is usually used.

If such a triangular waveform is applied as a driving voltage waveform for a polarization scrambler, instantaneous polarization changes along a longitude line (heavy solid line) of the Poincare sphere shown in FIG. 12, as described below. The points A and B on the longitude line of the Poincare sphere correspond to the points A and B on the triangular waveform shown in FIG. 11, respectively.

Initially, in the section AB of the triangular waveform of FIG. 11 in which the voltage increases, instantaneous polarization starts from the point A, changes along the longitude line (heavy solid line) of the Poincare sphere of FIG. 12 in the direction indicated by an arrow (A→B), and reaches the point B (which is coincident with the point A).

In the section BA of the triangular waveform of FIG. 11 in which the voltage decreases, instantaneous polarization starts from the point B in the opposite direction and returns to the point A. Each time an increase and decrease in the driving voltage waveform is repeated in this way, instantaneous polarization changes repeatedly along the longitude line (heavy solid line) of the Poincare sphere with the point A (point B) as the starting point and end point.

Therefore, in this case, instantaneous polarization is distributed uniformly on the longitude line (heavy solid line) of the Poincare sphere. Thus, it is understood that the DOP calculated by average Stokes vectors is ideally zero.

For a more detailed discussion on the operation of polarization scramblers employing LN, see, for example, F. Heisman, "Compact Electro-Optic Polarization Scramblers for Optically Amplified Lightwave Systems," IEEE Journal of Lightwave Technology Vol. 14, No. 8 1801 (1996). In the case of polarization scramblers employing birefringent materials other than LN, a driving voltage waveform in which the voltage changes linearly, such as a triangular waveform, is not always optimum. That is, it is necessary to select a driving voltage waveform which can change a refractive index difference Δn so that Stokes vectors (state of polarization) are distributed uniformly on the longitude line of the Poincare sphere within the cycle of the driving voltage waveform.

In the case where transmission factors for optical components are measured by a light source (such as a semiconductor laser, an LED, a SLD, etc.), a polarization scrambler, and an optical spectrum analyzer, measurements are made in a wide wavelength range by the optical spectrum analyzer and therefore the DOP must be small in the wide wavelength range. For instance, considering measurements are made in S, C, and L bands that are used for optical communication, the DOP has to be small in a wide range of 1450 to 1620 nm.

However, as previously described, the amplitude of a driving voltage waveform is adjusted so that the phase difference Δφ is exactly 0 to 2π at a certain wavelength λ0. Because of this, if the wavelength λ of incident light to be scrambled is shifted form the wavelength λ0, the phase difference Δφ will change in inverse proportion to the wavelength λ. For example, if the wavelength λ becomes smaller than the wavelength λ0, the phase difference Δφ will increase in inverse proportion to the wavelength λ. As a result, the maximum value of the phase difference Δφ becomes greater than 2π, instantaneous polarization is no longer uniformly distributed on the longitude line of the Poincare sphere, and the DOP increases.

Figure 13:
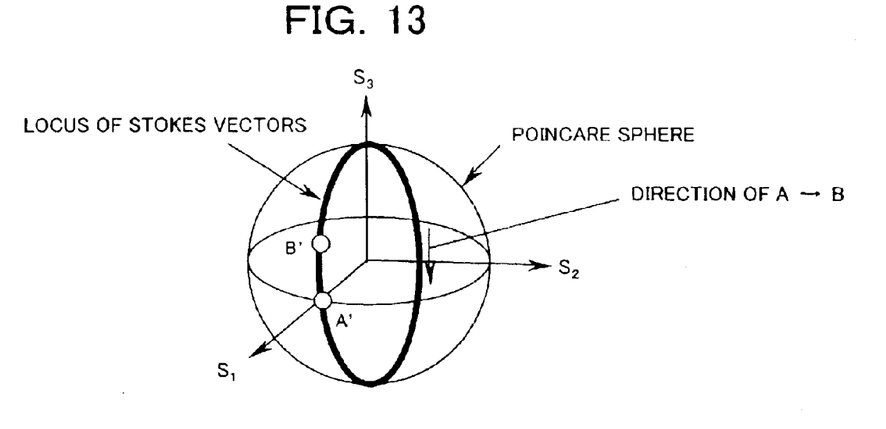
FIG. 13 is a diagram showing the locus of changes in polarization on the Poincare sphere to explain problems found in the conventional polarization scrambler.

The locus of the instantaneous polarization at this time is shown in FIG. 13. The points A' and B' on a longitude line (heavy solid line) of the Poincare sphere shown in the figure correspond to the points A and B on the driving voltage waveform (triangular waveform) shown in FIG. 11, respectively. As shown in FIG. 13, instantaneous polarization starts from the point A' on the longitude line and changes in the direction indicated by an arrow. Since the maximum value of the phase difference Δφ becomes greater than 2π, instantaneous polarization reaches the point B' (which is longer than the length around the longitude line) beyond the point A'. Thereafter, instantaneous polarization changes in the opposite direction from the point B' and returns to the point A'.

That is, in this case, the locus of instantaneous polarization is repeated over the arc A'B' of the Poincare sphere, so instantaneous polarization is not uniformly distributed and DOP increases. The same is also true of polarization scramblers employing birefringent materials other than LN, and driving voltage waveforms different in shape from the above-described triangular waveform.

A DOP for the polarization scrambler shown in FIG. 10 is given as a function of wavelength λ by the following Eq. (3):

$$DOP = 2 \times |\sin(2\pi\lambda 0/\lambda)|/(2\pi\lambda 0/\lambda) \qquad (3)$$

Figure 14:
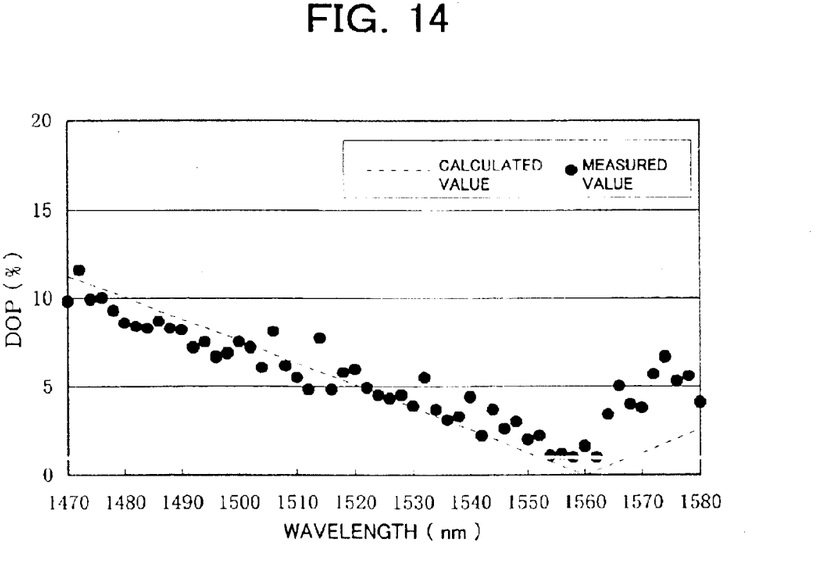
FIG. 14 is a diagram showing DOPs calculated and measured with respect to wavelengths to explain the problems found in the conventional polarization scrambler.

FIG. 14 shows values calculated by Eq. (3) and measured values. As shown in the figure, it is understood that the calculated values are well coincident with the measured values and that DOP can be sufficiently evaluated from the calculated values. In this case, the amplitude of a driving voltage waveform is adjusted so that the aforementioned phase difference Δφ is exactly 0 to 2π at a wavelength of λ0=1560 nm, that is, so that DOP has a minimum at a wavelength of λ0=1560 nm. It is also understood that if the wavelength λ of incident light is shifted from λ0=1560 nm, DOP increases linearly and that DOP rises up to about 11% at wavelength λ=1470 nm.

Considering measurements are made in S, C, and L bands that are used for optical communication, it is preferable to set λ0 to 1530 nm which is the center between 1450 nm and 1620 nm. However, in the case of wavelength λ=1450 nm (or λ=1620 nm), DOP calculated by Eq. (3) is about 11% and has a bad effect on measurement.

Thus, in the case of the polarization scrambler employing the conventional driving voltage waveform, the DOP is great in a wide wavelength range, for example, a range of 1450 to 1620 nm which is S, C, and L bands for optical communication, and has a bad effect on measurement. As a result, the conventional polarization scrambler cannot be used as a polarization scrambler for a measurement light source.

SUMMARY OF THE INVENTION

The present invention has been made in view of the above-described circumstances. Accordingly, it is the primary object of the present invention to make DOP smaller even in a wide wavelength range.

To achieve this end and in accordance with the present invention, there is provided a first method of controlling a polarization scrambler which changes a state of polarization of incident light with time in accordance with a driving voltage. The method comprises the steps of:

applying the driving voltage so that the polarization state of the incident light changes from a starting point and makes N rotations (where N is a positive integer) around a longitude line of the Poincare sphere in a unit time, and then applying the driving voltage so that the polarized light at the starting point on the Poincare sphere becomes the polarized light at a symmetrical position on the Poincare sphere instantaneously; and applying the driving voltage so that the polarization state of the incident light changes from the symmetrical position and makes N rotations around the longitude line of the Poincare sphere in a unit time, and then applying the driving voltage so that the polarized light at the symmetrical position on the Poincare sphere becomes the polarized light at the starting point instantaneously.

Further in accordance with the present invention, there is provided a second method of controlling a polarization scrambler so that a state of polarization of incident light makes a rotation around a longitude line of the Poincare sphere in a unit time in order to make a degree of polarization of light of a specific wavelength zero. When a wavelength, in which the polarization state changes a distance greater or less than the length around the longitude line of the Poincare sphere, occurs on a shorter or longer wavelength side than the specific wavelength, polarized light is shifted at a boundary between first and second unit times so that an excess or deficiency in polarized light on the Poincare sphere within the first unit time at the wavelength on the shorter or longer wavelength side and polarized light at an approximately symmetrical position cancel within the second unit time.

Further in accordance with the present invention, there is provided a circuit for driving a polarization scrambler which serves as a variable phase shifter by applying a variable voltage. The circuit comprises a circuit for generating a third voltage in which a second voltage varying in a second cycle is superposed on a first voltage varying in a first cycle, and applying the third voltage across the polarization scrambler.

In the circuit of the present invention, the aforementioned first voltage may have a voltage change which causes incident light to be in a state of non-polarization. The aforementioned second voltage may have a voltage component which causes a phase difference in the phase shifter to shift instantaneously by 180 degrees.

Further in accordance with the present invention, there is provided a third method of controlling a polarization scrambler which changes a state of polarization of incident light with time in accordance with a driving voltage. The method comprises a first step of applying the driving voltage so that the polarization state of the incident light changes from a starting point and makes N rotations (where N is a positive integer) around a longitude line of the Poincare sphere in a unit time, and a second step of applying the driving voltage so that the polarized light at the starting point on the Poincare sphere becomes the polarized light at an arbitrary position on the Poincare sphere instantaneously. The first step and the second step are repeated.

As set forth above, the control method of the present invention repeatedly performs a first step of applying the driving voltage so that the polarization state of the incident light changes from a starting point and makes N rotations (where N is a positive integer) around a longitude line of the Poincare sphere in a unit time, and a second step of applying the driving voltage so that the polarized light at the starting point on the Poincare sphere becomes the polarized light at an arbitrary position on the Poincare sphere instantaneously. Therefore, when the wavelength of incident light is shifted from a specific wavelength, a driving voltage for a polarization scrambler is controlled so that it compensates for an excess or deficiency in the polarization state which occurs partially on a longitude line of the Poincare sphere. More specifically, the driving voltage is controlled to shift polarized light at a boundary between first and second unit times so that an excess or deficiency in polarized light on the Poincare sphere within the first unit time and polarized light at an approximately symmetrical position cancel within the second unit time. As a result, the aforementioned DOP can be made smaller than prior art, and incident light is caused to be in a state of non-polarization.

BRIEF DESCRIPTION OF THE DRAWINGS

The present invention will be described in further detail with reference to the accompanying drawings wherein.

DESCRIPTION OF THE PREFERRED EMBODIMENTS

Embodiments of the present invention will hereinafter be described in detail with reference to the drawings.

(A) Description of an Embodiment

Figure 1:
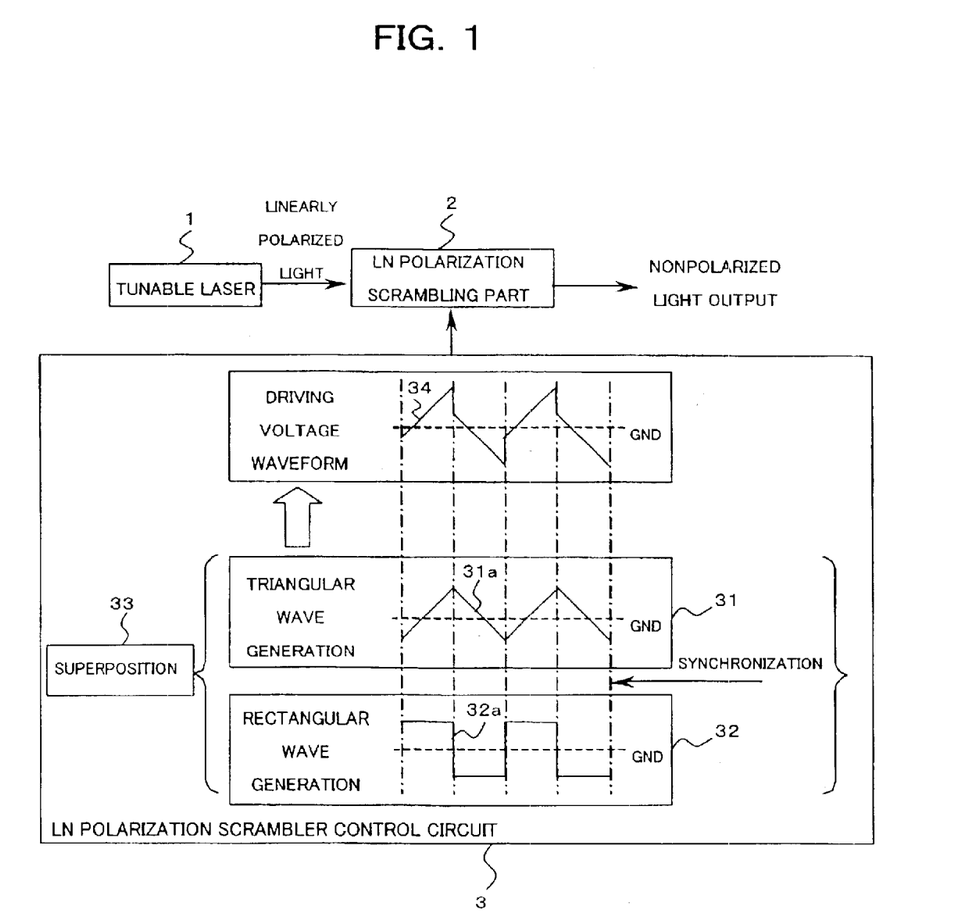
FIG. 1 is a block diagram showing a polarization scrambler constructed in accordance with an embodiment of the present invention.

FIG. 1 shows a block diagram of a polarization scrambler constructed in accordance with an embodiment of the present invention. The polarization scrambler shown in the figure includes a tunable laser 1, an LN polarization scrambling part 2, and an LN polarization scrambler control circuit 3.

The tunable laser 1 is used to generate linearly polarized light, which is scrambled by the LN polarization scrambling part 2. The tunable laser 1 is constructed of a semiconductor laser, an LED, a SOA (semiconductor optical amplifier), a SLD, or the like. The LN polarization scrambling part 2 has the same structure as that shown in FIG. 10. In accordance with a driving voltage waveform supplied from the LN polarization scrambler control circuit 3, the aforementioned refractive index difference Δn in LN (birefringent material) is caused to change so that the state of polarization of light incident on the tunable laser 1 changes with time. In this way, incident light is caused to be in a state of non-polarization. Examples of birefringent materials for changing the polarization state of incident light are an electro-optical crystal such as PLZT, etc., a liquid crystal, an optical fiber, a Faraday rotor, etc.

The LN polarization scrambler control circuit (drive circuit) 3 is used to generate a driving voltage waveform for the LN polarization scrambling part (phase shifter) 2 (also referred to as a polarization scrambler 2). In this embodiment, the LN polarization scrambler control circuit 3 generates a driving voltage waveform 34 such as that shown in FIGS. 1 and 2. The driving voltage waveform 34 is generated by superposing a second voltage waveform (in which the voltage varies in a second cycle) on a first or basic voltage waveform (in which the voltage varies in a first cycle). The second voltage waveform has a voltage component that causes a phase difference in the polarization scrambler 2 to shift instantaneously by 180 degrees.

The shape of the basic voltage waveform and the amplitude of the driving voltage waveform are set so that the aforementioned DOP has a minimum at a specific wavelength λ0 near the center of a band of wavelengths to be used (i.e., a band of wavelengths which incident light can have). That is, a voltage waveform, which has a voltage change causing polarized light to be in a state of non-polarization, is selected as the basic voltage waveform. More specifically, a voltage waveform, in which instantaneous polarization corresponding to a certain point on the basic voltage waveform is distributed uniformly on a longitude line of the Poincare sphere at the specific wavelength λ0, is selected as the basic voltage waveform. An example of such a basic voltage waveform is a waveform in which the voltage rises linearly to some value, and immediately falls linearly to the original value, that is, a triangular wave such as that shown in FIG. 11.

If the basic voltage wave alone is employed when the wavelength λ of incident light is shifted from the specific wavelength λ0, an excess or deficiency in instantaneous polarization will occur on the longitude lines of the Poincare sphere, as previously described in FIG. 13. However, if the aforementioned driving voltage waveform 34 is employed, the aforementioned excess or deficiency can be distributed uniformly on the longitude lines of the Poincare sphere. The aforementioned DOP is a value evaluated on average within the cycle of the driving voltage waveform 34. As a result, the aforementioned excess or deficiency are averaged and become smaller.

Now, a description will be given of changes in the state of instantaneous polarization in the case where the driving voltage waveform 34 is supplied to the polarization scrambler 2.

Figure 2:
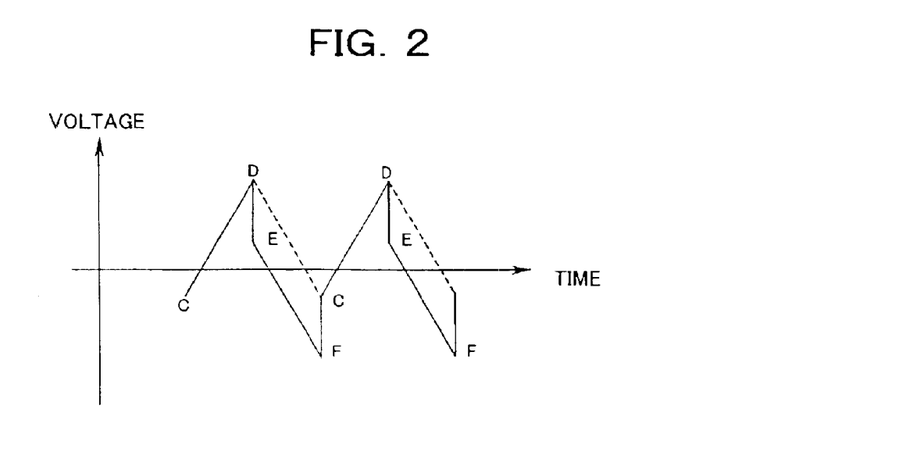
FIG. 2 is a diagram showing a driving voltage waveform for the polarization scrambler shown in FIG. 1.

As shown in FIG. 2, the driving voltage waveform 34 is formed from a broken line CDEF. The line segment EF is formed so that the line segment CD is inverted in the direction of voltage and that the point E has the same voltage as the midpoint of the line segment CD. In other words, the line segment EF is obtained by shifting part of the triangular wave CDC. Note that the entire driving voltage waveform 34 is offset so that the DC components do not occur.

Figure 3:
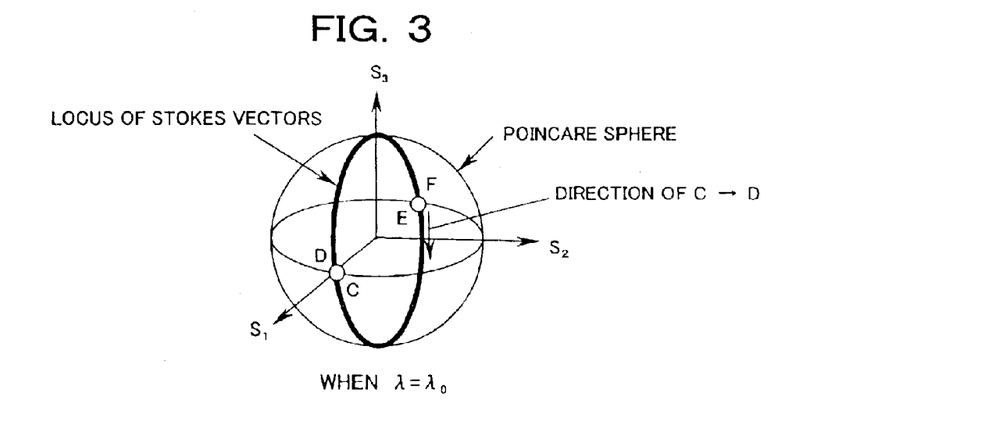
FIG. 3 is a diagram showing the locus of changes in polarization on the Poincare sphere ($\lambda=\lambda 0$) in the case where the driving voltage waveform shown in FIG. 2 is employed.

When λ=λ0, the point C, point D, point E, and point F on a longitude line (heavy solid line) of the Poincare sphere in FIG. 3 correspond to the point C, point D, point E, and point F on the driving voltage waveform 34 of FIG. 2, respectively.

Initially, a description will be given of the state of polarization in the section between the points C and D on the driving voltage waveform 34 shown in FIG. 2. In this section, the state of polarization starts from the point C (linear polarization on the equator of the Poincare sphere in FIG. 3), changes in the order of the north pole (right circular polarization), the equator (linear polarization at the points E and F), and the south pole (left circular polarization) in the direction indicated by an arrow, and reaches the point D (linear polarization with the same polarization plane as the point C).

The changes in the state of polarization from the point C to the point D are obtained by changing voltage linearly so that it changes by the same quantity of change in a predetermined unit time (section CD). More specifically, voltage is controlled so that when the phase difference between the components of ordinary light and extraordinary light within the polarization scrambler 2 causes the phase difference in the state of polarization at the starting point C to be 0 degrees, the phase difference between the components of ordinary light and the extraordinary light undergoes a change of 360 degrees when it makes a rotation around the longitude line of the Poincare sphere.

Next, a description will be given of the state of polarization in the section between the points D and E on the driving voltage waveform 34 shown in FIG. 2. In this section, voltage is applied across the polarization scrambler 2 so that polarized light in FIG. 3 changes instantaneously from the polarized light represented at points C (starting point) and D to the polarized light represented at the position symmetrical on the Poincare sphere (polarized light at point E). More specifically, polarized light in FIG. 3 can be changed from the polarized light represented at points C (starting point) and D to the symmetrical polarized light on the Poincare sphere (polarized light at point E), by controlling voltage so that the phase difference between the components of ordinary light and extraordinary light within the polarization scrambler 2 shifts by 180 degrees with respect to the phase difference between the components of ordinary light and extraordinary light at the starting point C.

Next, a description will be given of the state of polarization in the section between the points E and F on the driving voltage waveform 34 shown in FIG. 2. In this section, the state of polarization starts from the point E on the longitude line of the Poincare sphere in FIG. 3, changes in the order of the north pole (right circular polarization), the point C on the equator (linear polarization), and the south pole (left circular polarization) in the direction opposite to the direction indicated by an arrow, and reaches the point F. The changes in the state of polarization from the point E to the point F are similarly obtained by changing voltage linearly so that it changes by the same quantity of change in a predetermined unit time. That is, voltage is likewise controlled so that when the phase difference between the components of ordinary light and extraordinary light within the polarization scrambler 2 causes the phase difference in the state of polarization at the starting point C to be 0 degrees, the phase difference between the components of ordinary light and the extraordinary light undergoes a change of 360 degrees when it makes a rotation around the longitude line of the Poincare sphere.

Next, a description will be given of the state of polarization in the section between the points F and C on the driving voltage waveform 34 shown in FIG. 2. In this section, the voltage that is applied across the polarization scrambler 2 is controlled so that polarized light in FIG. 3 changes instantaneously from the polarized light represented at points F (starting point) and E to the polarized light represented at the position symmetrical on the Poincare sphere (polarized light at the points C and D). That is, polarized light in FIG. 3 can be changed from the polarized light represented at the point F (point E) to the polarized light represented at the symmetrical position (point C) on the Poincare sphere, by controlling voltage so that the phase difference between the components of ordinary light and extraordinary light within the polarization scrambler 2 shifts by 180 degrees with respect to the phase difference between the components of ordinary light and extraordinary light at the point F.

Thereafter, such changes in the state of polarization are repeated, each time the driving voltage waveform 34 shown in FIG. 2 is repeated. As a result, polarized light is distributed uniformly on a longitude line on the Poincare sphere, and DOP becomes zero.

Figure 4:
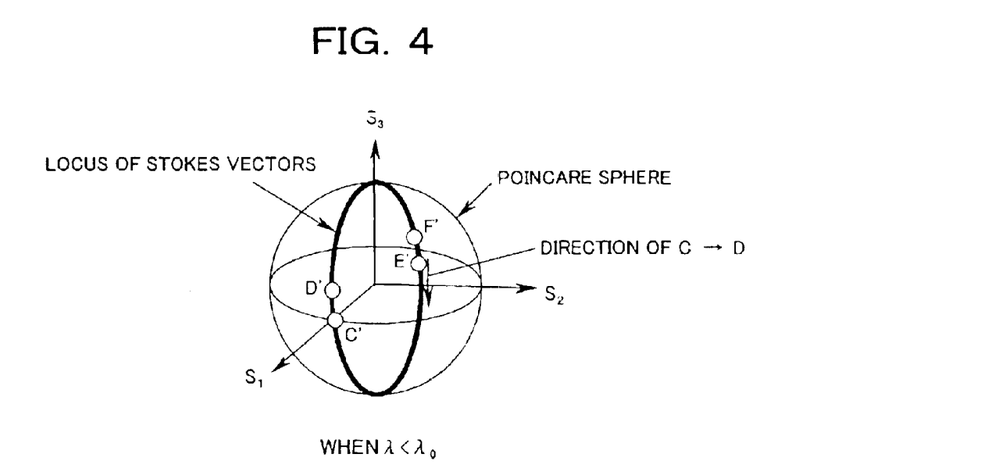
FIG. 4 is a diagram showing the locus of changes in polarization on the Poincare sphere ($\lambda<\lambda 0$) in the case where the driving voltage waveform shown in FIG. 2 is employed.

When $\lambda<\lambda 0$, the point C', point D', point E', and point F' on a longitude line (heavy solid line) of the Poincare sphere in FIG. 4 correspond to the point C, point D, point E, and point F on the driving voltage waveform 34 of FIG. 2, respectively.

In the section between the points C and D on the driving voltage waveform 34, if the driving voltage across the polarization scrambler 2 changes linearly in the same quantity of change, then instantaneous polarization starts from the polarization point C' of FIG. 4, changes in the order of the north pole (right circular polarization), the equator (linear polarization), and the south pole (left circular polarization) in the direction indicated by an arrow, and arrives at the point D'. In this case, the point D' does not coincide with the point C', and the arc C'D' is repeated.

That is, in this case, by changing the driving voltage linearly as described above, the polarization scrambler 2 is controlled so that instantaneous polarization makes a rotation around a longitude line of the Poincare sphere in a unit time (section CD) in order to make the DOP of light with a specific wavelength $\lambda 0$ zero. Because of this, at wavelengths shorter than $\lambda 0$, a wavelength $\lambda$ which makes one or more rotation around a longitude line of the Poincare sphere occurs. As a result, the state of polarization is partially offset by the amount of the arc C'D' on a longitude line of the Poincare sphere.

Next, in the section between the points D and E on the driving voltage waveform 34 (i.e., a boundary line between unit times), polarized light changes instantaneously because the driving voltage changes instantaneously. On the Poincare sphere, polarized light changes instantaneously from the point D' to the point E'. The polarized light at this point E' is polarized light at a position approximately symmetrical with the point D' on the Poincare sphere.

Next, in the section between points E and F on the driving voltage waveform 34, if the driving voltage across the polarization scrambler 2 changes linearly in the same quantity of change, then instantaneous polarization starts from the polarization point E' of FIG. 4, changes in the order of the north pole (right circular polarization), the equator (linear polarization), the south pole (left circular polarization), and the point E' (linear polarization) in the direction opposite from the direction indicated by an arrow, and arrives at the point F'. As with the above-described case, the point F' does not coincide with the point E', and the arc E'F' is repeated.

That is, as with the above-described case, by changing the driving voltage linearly, the polarization scrambler 2 is controlled so that instantaneous polarization makes a rotation around a longitude line of the Poincare sphere in a unit time (section EF) in order to make the DOP of light with a specific wavelength $\lambda 0$ zero. Therefore, at wavelengths shorter than $\lambda 0$, a wavelength $\lambda$ which makes one or more rotations around a longitude line of the Poincare sphere occurs. As a result, the state of polarization is partially offset by the amount of the arc E'F' on a longitude line of the Poincare sphere.

Thereafter, at the points F and C on the driving voltage waveform 34, the state of polarization changes instantaneously to the point C'. Such changes in the state of polarization are hereinafter repeated, each time the driving voltage waveform 34 is repeated. That is, the driving voltage waveform 34 repeatedly performs the operation of applying the driving voltage so that the state of polarization of incident light makes a rotation around a longitude line of the Poincare sphere in a unit time, and the operation of applying the driving voltage so that the polarized light at the starting point C on the Poincare sphere becomes the polarized light at a position approximately symmetrical on the Poincare sphere instantaneously.

Since the cycle of the driving voltage waveform 34*is* the section from the point C to the point F, an average Stokes parameter (state of polarization) needs to be considered in this cycle. Since the repeated arcs C'D' and E'F' on a longitude line of the Poincare sphere are at positions approximately symmetrical with respect to the center of the Poincare sphere, the offsets of the state of polarization cancel and therefore the influence of the repetition becomes small. As a result, DOP can be made smaller even when $\lambda<\lambda 0$.

In other words, when $\lambda<\lambda 0$, this embodiment controls the driving voltage for the polarization scrambler 2 so that polarized light shifts at the boundary (points D and E in FIG. 2) between unit times so that the repeated polarization within a unit time (section CD in FIG. 2) and the approximately symmetrical polarization cancel within the next unit time (section EF in FIG. 2). Therefore, this embodiment is capable of making DOP smaller even when the wavelength $\lambda$ of incident light is shifted from a specific wavelength $\lambda 0$.

Note that the refractive index An of the polarization scrambler 2 becomes positive or negative, depending on the physical properties of the scrambler 2. The rotation direction of the polarization state on the Poincare sphere is reversed by the difference. However, the repetition of the polarization state on a longitude line of the Poincare sphere always occurs at wavelengths shorter than the specific wavelength $\lambda 0$.

In the case of $\lambda>\lambda 0$, a deficiency in the state of polarization occurs on a longitude line of the Poincare sphere. That is, the state of polarization which does not develop occurs. In such a case, deficiencies develop equally at positions approximately symmetrical on a longitude line of the Poincare sphere with respect to the center of the Poincare sphere, and therefore the influence of deficiencies becomes smaller.

To realize the above-described operation, the LN polarization scrambler control circuit 3 in this embodiment includes a triangular wave generation circuit 31, a rectangular wave generation circuit 32, and a superposition circuit 33. The triangular wave generation circuit 31 is used for generating a triangular wave 31*a* as the aforementioned basic voltage waveform (in which the voltage varies in a first cycle). The rectangular wave generation circuit 32 is used for generating a rectangular wave 32a as the aforementioned voltage that varies in a second cycle. The above-described driving voltage waveform 34 is generated by superposing the triangular wave 31a and the rectangular wave 32a with the superposition circuit 33. Thus, the driving voltage waveform 34 can be generated with a simple structure.

The DOP of the polarization scrambler 2 is expressed as a function of wavelength λ by the following Eq. (4):

$$DOP=4\times|\sin(\pi\lambda 0/\lambda)\times\sin((\pi/2)\lambda 0/\lambda)|/(4\pi\lambda 0/\lambda) \qquad (4)$$

Figure 5:
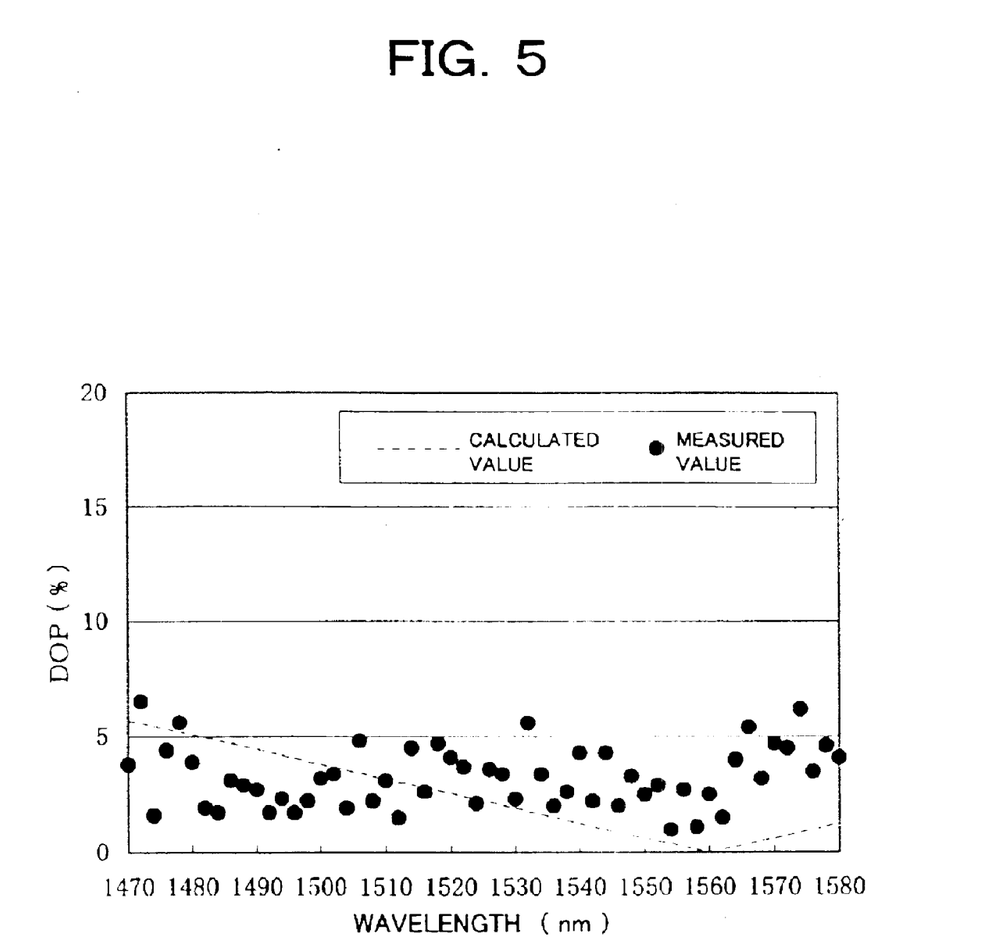
FIG. 5 is a diagram showing DOPs calculated and measured with respect to wavelengths in the case where the driving voltage waveform shown in FIG. 2 is employed.

FIG. 5 shows values calculated by Eq. (4) and measured values. As shown in the figure, it is understood that considering errors contained in the measured values, the calculated values are approximately coincident with the measured values. Note that the amplitude of the driving voltage waveform 34 is adjusted so that the DOP has a minimum at a wavelength of λ0=1560 nm. Even if wavelength λ is shifted from λ0=1560 nm, the DOP hardly changes and is about 6% or less, which is equal to one-half prior art (see FIG. 14).

According to this embodiment, as described above, the driving voltage waveform 34 is employed to partially shift at a plurality of positions the basic voltage waveform 31a in which a plurality of polarization states of incident light with a specific wavelength λ0 are distributed uniformly on a longitude line of the Poincare sphere. Therefore, even when the wavelength λ of incident light is shifted from the specific wavelength λ0, this embodiment is capable of compensating for an excess or deficiency in a polarization state which occurs partially on a longitude line of the Poincare sphere Thus, the aforementioned DOP can be made one-half or less of prior art in a wider wavelength range than prior art, for example, a range of 1450 to 1620 nm that includes S, C, L bands that are used for optical communication. As a result, measurements in a wide wavelength range, such as measurements of transmission factors for optical components, can be made with a light source (e.g., a semiconductor laser, an LED, a SLD, etc.), the polarization scrambler of this embodiment, an optical spectrum analyzer (measurement evaluating device), etc.

However, in this case, the cycle of the driving voltage waveform 34 of the polarization scrambler has to be shorter than the response time or sampling time of a measurement evaluating device.

Note that in the case of polarization scramblers employing birefringence materials other than LN, a driving voltage waveform in which the basic voltage waveform is partially shifted at a plurality of positions with respect to voltage can also be generated by similar means. In the case where polarization scramblers 2 are connected in multiple stages, the aforementioned driving voltage waveform 34 can be generated according to this embodiment.

In the above-described embodiment, while the driving voltage is linearly varied so that a change in polarized light changes from a starting point and makes a rotation around a longitude line of the Poincare sphere in each of the unit times (section CD and section EF) of the driving voltage waveform 34, it may make two or more rotations (N≧2) in the same unit time. In this case, as with the aforementioned case, polarized light is distributed uniformly on a longitude line of the Poincare sphere within a predetermined time, so the DOP can be made smaller. In other words, it is necessary that the driving voltage waveform 34 have as a basic voltage waveform a voltage component which has a voltage change which causes polarized light with a specific wavelength λ0 to be distributed uniformly on a longitude line of the Poincare sphere within a predetermined time and to be in a state of non-polarization.

(B) Description of Modifications

Figure 7:
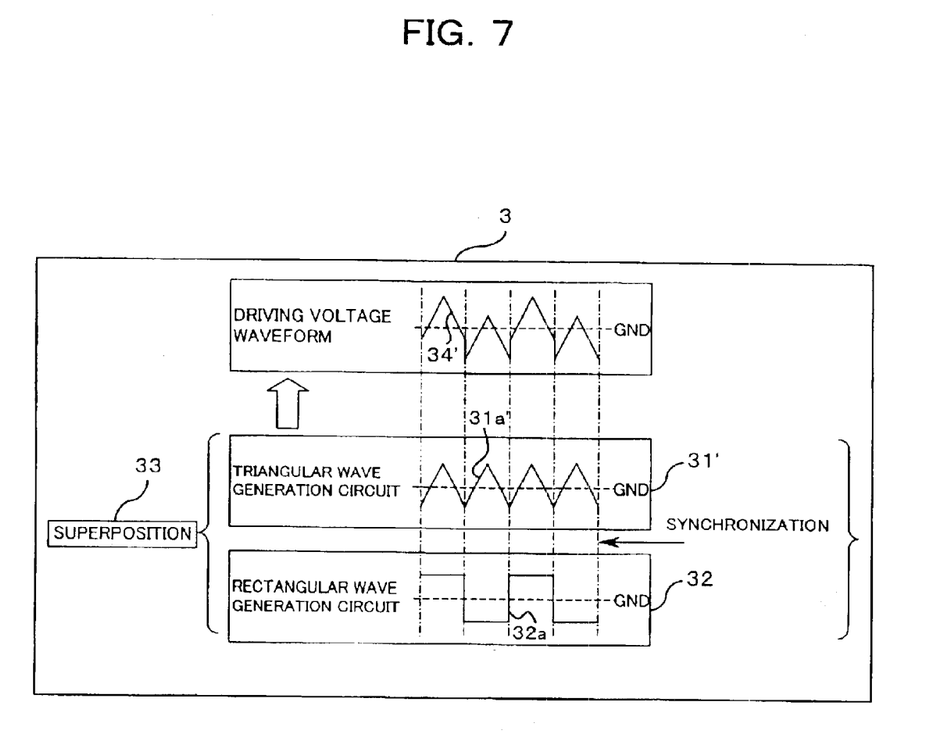
FIG. 7 is a block diagram showing another modification of the LN polarization scrambler control circuit shown in FIG. 1.

The present invention is not limited to the above-described driving voltage waveform 34. As shown in FIG. 7, for example, a driving voltage waveform 34' can be generated by superposing a triangular wave 31a' generated by a triangular-wave generation circuit 31' on a rectangular wave 32a with a superposition circuit 33. The triangular wave 31a' is different in cycle from the aforementioned triangular wave 31a.

With the driving voltage waveform 34', a plurality of kinds of polarization states are distributed uniformly on a longitude line of the Poincare sphere within the 1 cycle T of the waveform 34'. Therefore, the DOP can be made smaller in a wider wavelength range than prior art.

In addition, it can be easily understood that if in the driving voltage waveform 34 of FIG. 2, the number of positions where the voltage in the basic voltage waveform is partially shifted is increased, then the DOP will become smaller.

Figure 6:
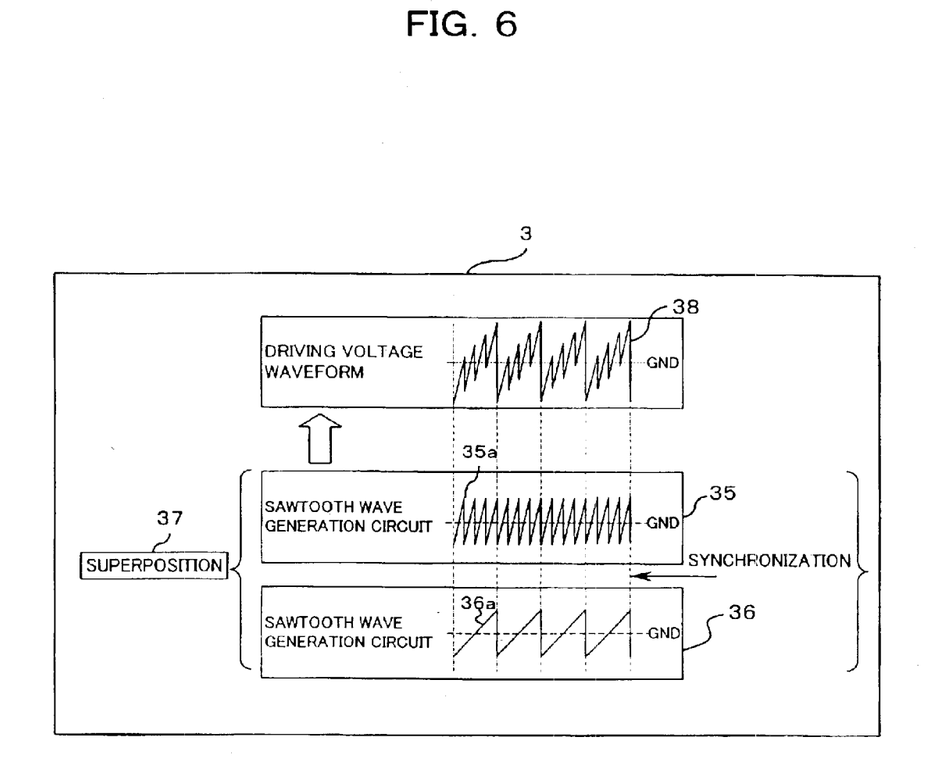
FIG. 6 is a block diagram showing a modification of the LN polarization scrambler control circuit shown in FIG. 1.

As shown in FIG. 6, for example, a first sawtooth waveform 35a that is a basic voltage waveform is generated with a first sawtooth generation circuit 35. A second waveform 36a shorter in wavelength than the first sawtooth waveform 35a is generated with a second sawtooth generation circuit 36. The first sawtooth waveform 35a and the second sawtooth waveform 36a are synchronized and superposed by a superposition circuit 37. In this way, there is obtained a driving voltage waveform 38 which has 4 positions at which the phase difference between the components of ordinary light and extraordinary light with the polarization scrambler 2 is instantaneously shifted within a unit time by 90 degrees.

With the driving voltage waveform 38, a plurality of kinds of polarization states are distributed uniformly on a longitude line of the Poincare sphere within the 1 cycle T of the waveform 38. Therefore, the DOP can be made smaller in a wider wavelength range than prior art. Note that even when the number of shifting positions is a value other than 2 or 4, the same advantage can be obtained.

(C) Others

The above-described polarization scrambler is effectively applicable to optical transmitters as well as optical components. In optical communication technology, for instance, an erbium-doped fiber amplifier is usually employed as an optical repeater, etc. However, if signal light with strong linear polarization is incident on such an erbium-doped fiber amplifier, a phenomenon will occur in which an erbium atom with a dipole moment in the same direction as the polarization direction is consumed and therefore the gain in a direction perpendicular to the linear polarization is relatively increased. (This phenomenon is called polarization hole burning.) For this reason it is effective to employ the above-described polarization scrambler.

In optical communication technology, it is preferable that polarization-scrambling speed (e.g., 6 to 40 GHz) be about twice faster than modulation speed (e.g., 2.5 to 20 Gbps). However, there are cases where polarization-scrambling speed is smaller than the gain recovery time of an optical amplifier and is 1 KHz or less.

Therefore, in such a case, the polarization scrambler of the present invention is also applicable to very high-speed optical communication, since it can easily generate the above-described driving voltage waveform 34 (34', 38). The DOP can be made smaller in a wide wavelength range of 1450 to 1620 nm that includes S, C, and L bands. As a result, the above-described polarization hole burning is prevented, and the degradation of optical communication quality can be prevented.

In addition, while the above-described embodiment employs the driving voltage waveform, the embodiment may employ a driving current wave form to control the polarization scrambler. The same advantages as the above-described embodiment can be similarly obtained. In the case of a driving current waveform, it is likewise desirable that the waveform have no DC component.

Furthermore, the number of shifting positions in the driving voltage waveform is not limited to the above-described example. The above-described polarization scrambler is also applicable to optical communication equipment other than the aforementioned equipment, and may be incorporated into a light source to realize a non-polarization light source.

While the present invention has been described with reference to the preferred embodiment thereof, the invention is not to be limited to the details given herein, but may be modified within the scope of the appended claims.

What is claimed is:

1. A method of controlling a polarization scrambler which changes a state of polarization of incident light with time in accordance with a driving voltage, said method comprising:
   applying the driving voltage so that the polarization state of said incident light changes from a starting point and makes N rotations (where N is a positive integer) around a longitude line of the Poincare sphere in a unit time; and
   applying the driving voltage so that the polarized light at said starting point on the Poincare sphere becomes the polarized light at a symmetrical position on the Poincare sphere instantaneously at the end of the unit time.

2. A method of controlling a polarization scrambler so that a state of polarization of incident light makes a rotation around a longitude line of the Poincare sphere in a unit time in order to make a degree of polarization of light of a specific wavelength zero, wherein:
   when a wavelength in which said polarization state changes a distance greater or less than the length around the longitude line of the Poincare sphere occurs on a shorter or longer wavelength side than said specific wavelength;
   polarized light is shifted at a boundary between first and second unit times so that an excess or deficiency in polarized light on the Poincare sphere within the first unit time at said wavelength on said shorter or longer wavelength side and polarized light at an approximately symmetrical position cancel within said second unit time.

3. A circuit for driving a polarization scrambler which serves as a variable phase shifter by applying a variable voltage, said circuit comprising
   a circuit for generating a third voltage in which a second voltage varying in a second cycle is superposed on a first voltage varying in a first cycle, and applying said third voltage across said polarization scrambler.

4. The circuit as set forth in claim 3, wherein:
   said first voltage has a voltage change which causes incident light to be in a state of non-polarization; and
   said second voltage has a voltage component which causes a phase difference in said phase shifter to shift instantaneously by 180 degrees.

5. A method of controlling a polarization scrambler which changes a state of polarization of incident light with time in accordance with a driving voltage, said method comprising:
   a first step of applying the driving voltage so that the polarization state of said incident light changes from a starting point and makes N rotations (where N is a positive integer) around a longitude line of the Poincare sphere in a unit time;
   a second step of applying the driving voltage so that the polarized light at said starting point on the Poincare sphere becomes the polarized light at an arbitrary position on the Poincare sphere instantaneously; and
   a third step of repeating said first step and said second step.

6. An apparatus for controlling a polarization scrambler which changes a state of polarization of incident light with time in accordance with a driving voltage, the apparatus comprising:
   means for applying the driving voltage so that the polarization state of said incident light changes from a starting point and makes N rotations (where N is a positive integer) around a longitude line of the Poincare sphere in a unit time; and
   means for applying the driving voltage so that the polarized light at said starting point on the Poincare sphere becomes the polarized light at a symmetrical position on the Poincare sphere instantaneously at the end of the unit time.

7. An apparatus comprising:
   means for controlling a polarization scrambler so that a state of polarization of incident light makes a rotation around a longitude line of the Poincare sphere in a unit time in order to make a degree of polarization of light of a specific wavelength zero; and
   means, when a wavelength in which said polarization state changes a distance greater or less than the length around the longitude line of the Poincare sphere occurs on a shorter or longer wavelength side than said specific wavelength, for shifting polarized light at a boundary between first and second unit times so that an excess or deficiency in polarized light on the Poincare sphere within the first unit time at said wavelength on said shorter or longer wavelength side and polarized light at an approximately symmetrical position cancel within said second unit time.

8. A circuit for driving a polarization scrambler which serves as a variable phase shifter by applying a variable voltage, said circuit comprising
   means for generating a third voltage in which a second voltage varying in a second cycle is superposed on a first voltage varying in a first cycle; and
   means for applying said third voltage across said polarization scrambler.

9. An apparatus for controlling a polarization scrambler which changes a state of polarization of incident light with time in accordance with a driving voltage, said method comprising:
   first means for applying the driving voltage so that the polarization state of said incident light changes from a starting point and makes N rotations (where N is a positive integer) around a longitude line of the Poincare sphere in a unit time;
   second means for applying the driving voltage so that the polarized light at said starting point on the Poincare sphere becomes the polarized light at an arbitrary position on the Poincare sphere instantaneously; and
   means for repeating said applying the driving voltage by the first means and said applying the driving voltage by the second means.

* * * * *